US012779856B2

(12) United States Patent
Saito et al.

(10) Patent No.: US 12,779,856 B2
(45) Date of Patent: Nov. 3, 2026

(54) RECORDING APPARATUS AND CLEANING METHOD OF RECORDING APPARATUS

(71) Applicant: CANON KABUSHIKI KAISHA, Tokyo (JP)

(72) Inventors: Yoshikazu Saito, Tokyo (JP); Takatoshi Nakano, Kanagawa (JP); Yutaka Kano, Kanagawa (JP); Tsukasa Sano, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/638,359

(22) Filed: Apr. 17, 2024

(65) Prior Publication Data

US 2024/0359467 A1 Oct. 31, 2024

(30) Foreign Application Priority Data

Apr. 27, 2023 (JP) ................................ 2023-073846

(51) Int. Cl.
*B41J 2/165* (2006.01)

(52) U.S. Cl.
CPC ....... *B41J 2/16552* (2013.01); *B41J 2/16532* (2013.01); *B41P 2235/27* (2013.01)

(58) Field of Classification Search
CPC ......................... B41J 2/16532; B41J 2/16552; B41J 2/16535; B41J 2002/16558; B41P 2235/27
See application file for complete search history.

(56) References Cited

U.S. PATENT DOCUMENTS

| | | | | |
|---|---|---|---|---|
| 4,454,519 A * | 6/1984 | Oosaka | B41J 2/06 347/45 |
| 2010/0079539 A1* | 4/2010 | Inoue | B41J 11/00216 347/33 |
| 2018/0194141 A1* | 7/2018 | Araki | B41J 2/16508 |

FOREIGN PATENT DOCUMENTS

| | | |
|---|---|---|
| JP | 2007030453 A * | 2/2007 |
| JP | 2007168293 A * | 7/2007 |
| JP | 2010082856 A | 4/2010 |
| JP | 2012201102 A | 10/2012 |
| JP | 2013169651 A | 9/2013 |

OTHER PUBLICATIONS

Machine translation of JP2007-168293A (Year: 2007).*
Machine translation of JP2007-030453A (Year: 2007).*

* cited by examiner

*Primary Examiner* — Douglas Lee
(74) *Attorney, Agent, or Firm* — Canon U.S.A., IP Division

(57) ABSTRACT

A method to clean a discharge port surface of a recording apparatus includes applying a cleaning liquid to the discharge port surface by a cleaning liquid application unit. The discharge port surface includes a discharge port line, a hydrophilic part, and a water-repellent part located between the hydrophilic part and the discharge port line. A plurality of discharge ports to discharge a liquid is aligned in a first direction. The hydrophilic part is provided separated from the discharge port line and protrudes from the discharge port surface in a discharge direction of the liquid from the plurality of discharge ports. After the cleaning liquid is applied to the discharge port surface, a cleaning liquid removal unit removes the applied cleaning liquid in a state where the cleaning liquid has been moved onto the hydrophilic part.

13 Claims, 9 Drawing Sheets

RECORDING APPARATUS AND CLEANING METHOD OF RECORDING APPARATUS

BACKGROUND

Field

The present disclosure relates to a recording apparatus and a cleaning method of a recording apparatus.

Description of the Related Art

In the inkjet recording method, ink is discharged from an inkjet recording head through a discharge port to form an image on a recording medium. In general, in order to keep favorable a state where the ink is discharged from the inkjet recording head, the inkjet recording apparatus is provided with a cleaning mechanism that cleans a sticking substance off the discharge port surface. Japanese Patent Application Laid-Open No. 2010-082856 discusses a cleaning method by which a cleaning liquid is applied to a nozzle surface and the cleaning liquid is wiped by a wiping member.

However, in the configuration of Japanese Patent Application Laid-Open No. 2010-082856, if a solid substance with a low degree of solubility in the cleaning liquid sticks to the nozzle surface, the cleaning liquid is let permeate into the interface between the nozzle surface and the solid substance to peel off the solid substance and clean the discharge port surface. However, the peeled solid substance may become lodged at and around the discharge port.

SUMMARY

The present disclosure is directed to efficiently cleaning a discharge port surface.

According to an aspect of the present disclosure, a cleaning method of cleaning a recording apparatus including a recording head with a discharge port surface, wherein the cleaning method is a method for cleaning the discharge port surface and the discharge port surface includes a discharge port line in which a plurality of discharge ports configured to discharge a liquid is aligned in a first direction, a hydrophilic part that is provided separated from the discharge port line and protrudes from the discharge port surface in a discharge direction of the liquid from the plurality of discharge ports, and a water-repellent part that is located between the hydrophilic part and the discharge port line, the cleaning method includes applying a cleaning liquid to the discharge port surface by a cleaning liquid application unit, and removing the cleaning liquid by a cleaning liquid removal unit in a state where the cleaning liquid, applied to the discharge port surface in the applying of the cleaning liquid, has been moved onto the hydrophilic part.

Further features of the present disclosure will become apparent from the following description of exemplary embodiments with reference to the attached drawings.

DESCRIPTION OF THE EMBODIMENTS

A first exemplary embodiment of the present disclosure will be specifically described with reference to the drawings. The components of the exemplary embodiment are mere examples, and the configuration and various conditions of the apparatus to which the present disclosure is applied can be modified or changed without departing from the gist of the present disclosure and are not limited to those of the exemplary embodiment. For example, the dimensions, materials, and shapes of components in the exemplary embodiment, and their relative arrangements can be changed as appropriate depending on the configuration and various conditions of the apparatus to which the present disclosure is applied, and the present disclosure is not limited to the exemplary embodiments unless otherwise specified.

Figure 1A:
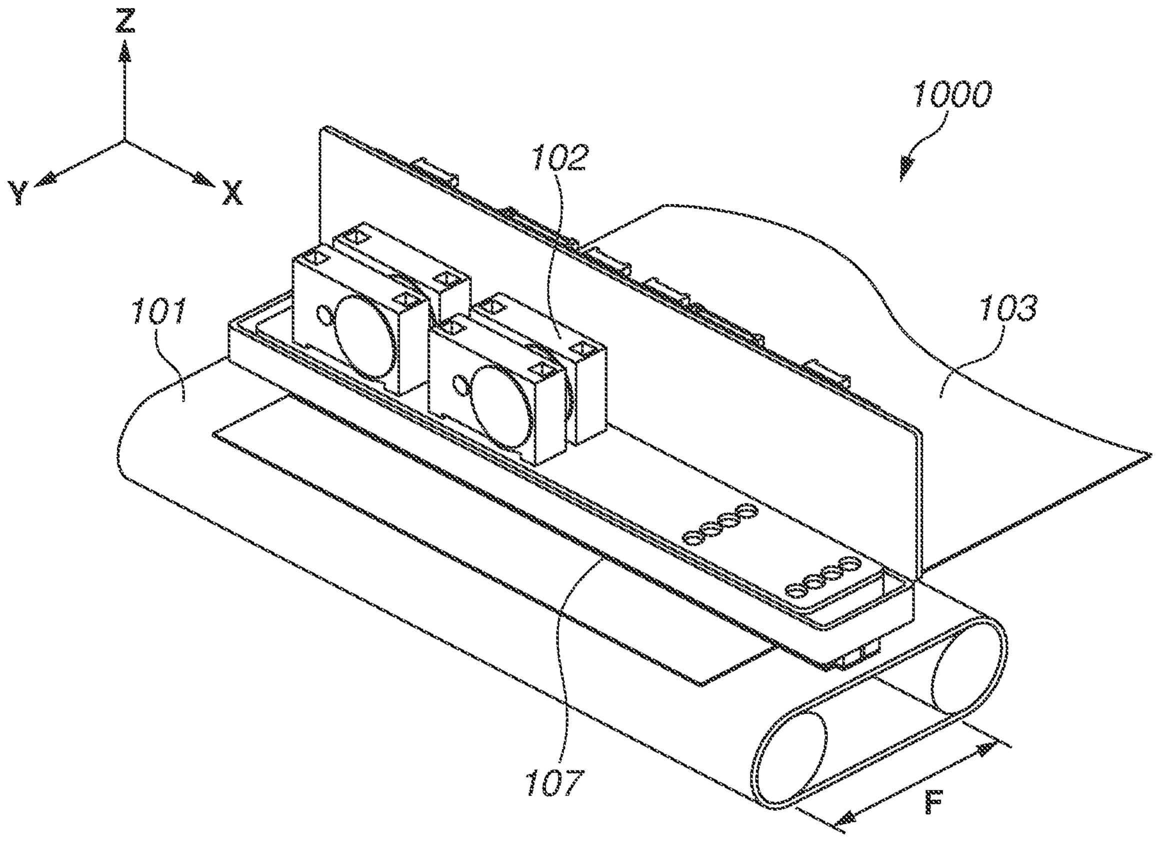
FIGS. 1A and 1B are schematic views of a recording apparatus according to the present disclosure, mainly illustrating a recording unit.
Figure 1B:
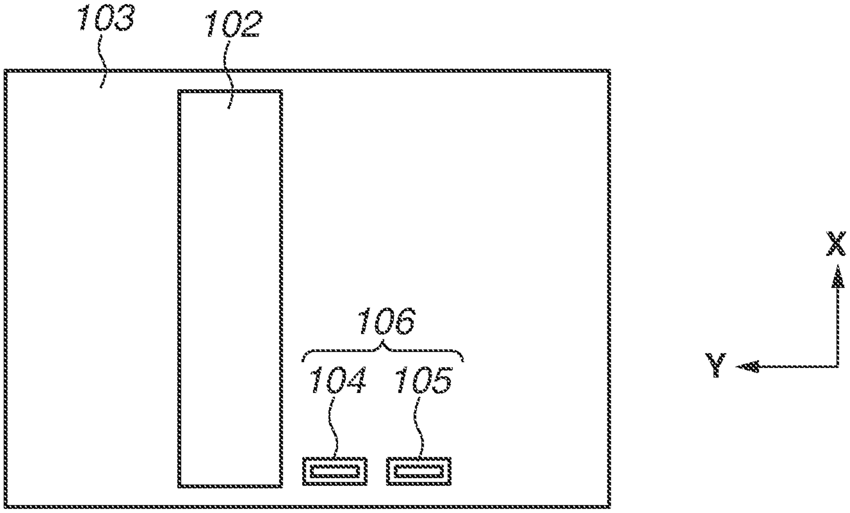

FIGS. 1A and 1B are schematic views of a recording apparatus according to the present disclosure, mainly illustrating a recording unit. FIG. 1A is a side view and FIG. 1B is a top view.

A recording apparatus 1000 includes a conveyance unit 101 that conveys a recording medium 103 in a Y direction, and a line-type recording head 102 in which discharge port lines (see FIG. 3) are arranged in an X direction orthogonal to the conveyance direction (Y direction). The recording head itself does not move but continuously or intermittently conveys the recording medium 103 to perform continuous recording. The type of the recording medium 103 is not limited to a cut type but may be a continuous roll type. The recording medium 103 can be paper or cloth, for example. The type of the recording head 102 is not limited to a line type and may be a serial type that performs recording while moving in the X direction with respect to the recording medium 103.

The recording head 102 can perform full-color printing with cyan (C), magenta (M), yellow (Y), and black (K) inks as liquids containing color materials. The inks discharged by the recording head 102 are not limited to the C, M, Y, and K inks but may be white ink, metallic ink, or the like. The recording head 102 fluidically communicates with a liquid supply unit that is a supply path to supply the liquid to the recording head, a main tank 1006, and a buffer tank 1003 (see FIG. 2) as described below. The recording head 102 includes discharge ports for discharging the ink onto a surface 107 (hereinafter, discharge port surface 107) facing the recording medium 103, and performs recording by discharging the ink onto the recording medium 103 conveyed by the conveyance unit 101. The recording apparatus 1000 has a cleaning mechanism 106 including a cleaning liquid application mechanism 104 that applies a cleaning liquid to the discharge port surface 107 of the recording head 102 and a sliding mechanism 105 that slides on the discharge port surface 107 to remove the cleaning liquid.

Figure 2:
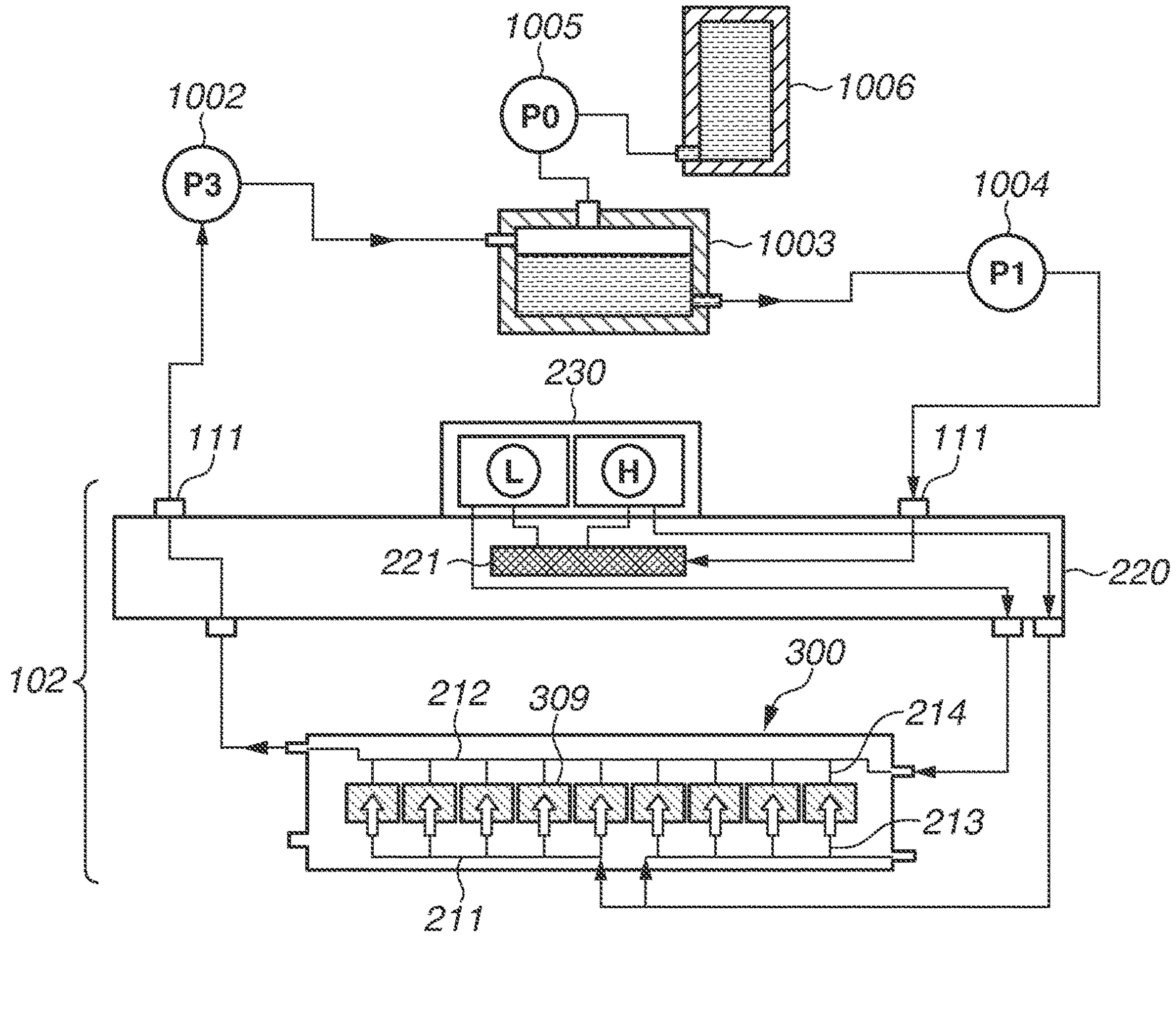
FIG. 2 is a schematic diagram illustrating a circulation path applied to the recording apparatus according to the present disclosure.

FIG. 2 is a schematic diagram illustrating a circulation path that is applied to the recording apparatus according to the present exemplary embodiment. The recording head 102 fluidically communicates with a first circulation pump 1002, a buffer tank 1003, and others. The buffer tank 1003 that is a sub-tank connected to the main tank 1006 has an air communication port (not illustrated) that causes the inside and outside of the tank to communicate with each other, and can eject air bubbles in the ink to the outside. The buffer tank 1003 is also connected to an auxiliary pump 1005. When the liquid is consumed by the recording head 102 due to discharge (ejection) of the ink from the discharge ports of the recording head 102 for recording by ink discharge and suction recovery, the auxiliary pump 1005 feeds the ink by the consumed amount from the main tank 1006 to the buffer tank 1003.

The first circulation pump 1002 has the role of drawing the liquid from a liquid connection part 111 of the recording head 102 and causing the liquid to flow to the buffer tank 1003. The first circulation pump 1002 is preferably a displacement pump that has a quantitative liquid feeding capability. Specific examples of the first circulation pump 1002 include a tube pump, a gear pump, a diaphragm pump, and a syringe pump, and others. For example, the first circulation pump 1002 may have a general constant flow valve or relief valve arranged at the outlet to secure a constant flow rate.

A negative pressure control unit 230 is provided in a path between the second circulation pump 1004 and a liquid discharge unit 300 included in the recording head 102. The negative pressure control unit 230 has the function of operating so as to maintain the pressure on the downstream side of the negative pressure control unit 230 (that is, the liquid discharge unit 300 side) at a preset constant pressure even if the flow rate of the circulation system varies due to the difference in the duty cycle of the recording image. Two pressure adjustment mechanisms included in the negative pressure control unit 230 may be any mechanisms that can control the pressure downstream thereof with variations in a specific range centering on a desired preset pressure or less. As an example, mechanisms similar to "pressure-reducing regulator" can be adopted. In the case of using pressure-reducing regulators, as illustrated in FIG. 2, the second circulation pump 1004 preferably applies pressure to the upstream side of the negative pressure control unit 230 via a liquid supply unit 220 included in the recording head 102. This suppresses the influence of a water head pressure on the recording head 102 of the buffer tank 1003, which makes it possible to extend the degree of freedom in the layout of the buffer tank 1003 in the recording apparatus 1000. The second circulation pump 1004 can be any pump that has a lifting pressure equal to or higher than a specific pressure in a range of ink circulation flow rate that is used at the time of driving the recording head 102, and a turbo pump or a displacement pump can be used. Specifically, a diaphragm pump or the like is applicable. Instead of the second circulation pump 1004, a water head tank arranged with a specific water head difference from the negative pressure control unit 230 can be used, for example.

As illustrated in FIG. 2, the negative pressure control unit 230 includes two pressure adjustment mechanisms that are set with different control pressures. As the two negative pressure adjustment mechanisms, the relatively high-pressure adjustment mechanism (described as H in FIG. 2) and the relatively low-pressure adjustment mechanism (described as L in FIG. 2) are connected to a common supply flow path 211 and a common collection flow path 212, respectively, in the liquid discharge unit 300 through the liquid supply unit 220. The liquid discharge unit 300 is provided with an individual supply flow path 213 and an individual collection flow path 214 that communicate with the common supply flow path 211, the common collection flow path 212, and each element chip 309. Since the individual supply flow path 213 and the individual collection flow path 214 communicate with the common supply flow path 211 and the common collection flow path 212, part of the liquid flown by the first circulation pump 1002 passes from the common supply flow path 211 through the internal flow paths in the element chips 309 to the common collection flow path 212 (arrows in FIG. 2). This is because a pressure difference is provided between the pressure adjustment mechanism H connected to the common supply flow path 211 and the pressure adjustment mechanism L connected to the common collection flow path 212, and the first circulation pump 1002 is connected to the common collection flow path 212, not to the common supply flow path 211.

In this manner, the liquid discharge unit 3000 has a flow of the liquid passing through the common collection flow path 212 and a flow of the liquid passing from the common supply flow path 211 through the element chip 309 to the common collection flow path 212. This makes it possible to release the heat generated in the element chips 309 to the outside of the element chips 309 by a flow of the liquid from the common supply flow path 211 to the common collection flow path 212. With this configuration, during recording by the recording head 102, a flow of the ink can be generated also in the discharge ports and the pressure chambers where no recording is performed, whereby it is possible to suppress thickening of the ink in these parts. For this reason, the recording head 102 in the present exemplary embodiment can perform high-speed and high-quality recording.

Figure 3A:
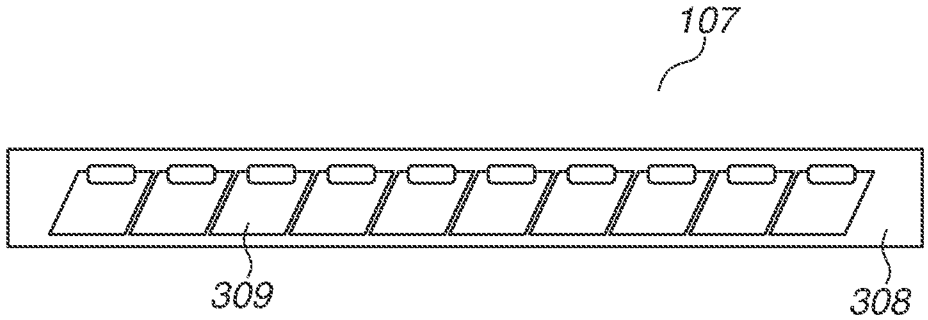
FIGS. 3A to 3C are schematic diagrams illustrating a configuration of a discharge port surface of a recording head according to a first exemplary embodiment.
Figure 3B:
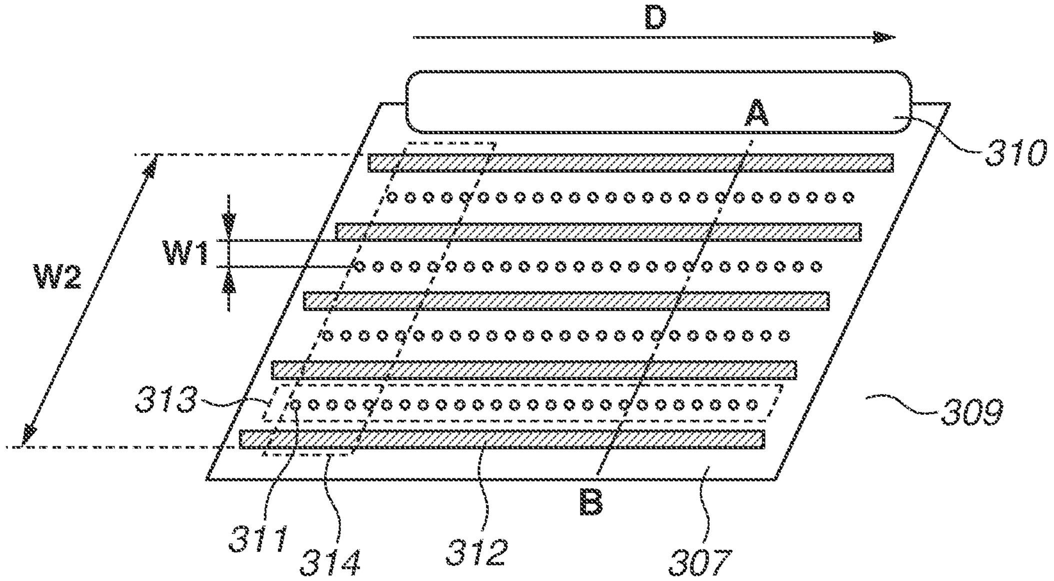
Figure 3C:
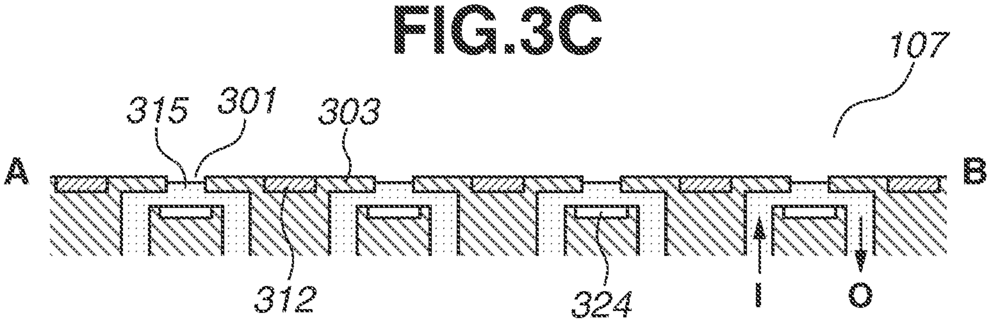

FIGS. 3A to 3C are schematic diagrams illustrating a configuration of the discharge port surface 107 of the recording head 102. FIG. 3A is a schematic diagram illustrating a configuration of the discharge port surface 107 of the recording head 102. The discharge port surface 107 of the recording head 102 has a plurality of element chips 309 arranged on a base substrate 308 along the longitudinal direction (X direction). FIG. 3B illustrates a configuration of the element chip 309, and FIG. 3C illustrates a cross section along line A-B in FIG. 3B. The discharge port surface 107 includes a plurality of lines of discharge ports 311 and discharge energy generation elements 324 corresponding to the discharge ports 311. Each element chip 309 and the base substrate 308 are connected together by an electrical connection part not illustrated. The electrical connection part is coated with a sealing part 310 made of a resin material or the like and is protected from corrosion or disconnection. When the first circulation pump 1002 and the second circulation pump 1004 are activated, the ink flows into a pressure chamber 315 in the direction of arrow I, and the ink having not been discharged from the discharge ports 311 flows out of the pressure chamber 315 in the direction of arrow O.

A surface 307 of the element chip 309 constitutes a water-repellent part that has undergone water repellent treatment except for hydrophilic surfaces 312 that are hydrophilic parts, and the water-repellent part is desirably formed of a material with a water contact angle of 90° or more. In the present exemplary embodiment, the hydrophilic surfaces 312 are formed in parallel to a longitudinal direction D of discharge port lines 313, and the discharge port lines 313 and the hydrophilic surfaces 312 are alternately arranged. The plurality of discharge port lines 313 is arranged in a direction crossing the direction D. The hydrophilic surfaces 312 are desirably formed of a material with a water contact angle of less than 90°. That is, the hydrophilic surfaces 312 are formed of a material that is relatively high in affinity for water as compared to the surface 307 of the element chip 309. In the present exemplary embodiment, a distance W1 between the center of the discharge port 311 and the hydrophilic surface 312 is set to 100 μm or more and 500 μm or less. However, the distance W1 may be changed as appropriate depending on the dimensions of the apparatus and the type of the ink. In order to separately form the water-repellent part and the hydrophilic part on the surface of the element chip 309, a publicly known technology is used such as photolithography or plasma treatment.

Figure 4A:
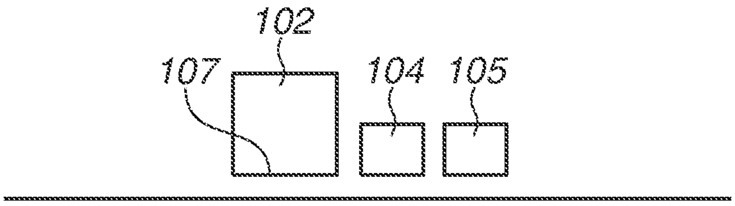
FIGS. 4A to 4E are diagrams illustrating states of a cleaning process of cleaning the discharge port surface according to the first exemplary embodiment.
Figure 4B:
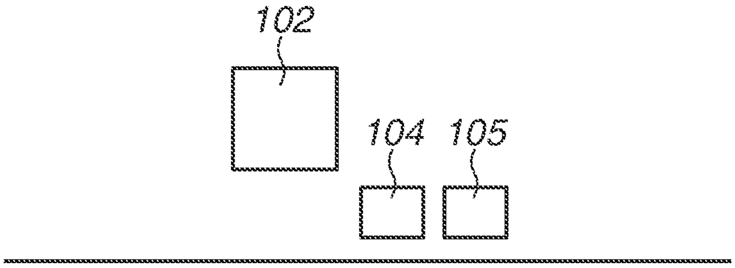

FIGS. 4A to 4E are diagrams illustrating states of a cleaning process of cleaning the discharge port surface 107. The cleaning process of the discharge port surface 107 in the present exemplary embodiment can be roughly divided into a cleaning liquid application step and a cleaning liquid removal step. Each step will be described. Before the start of the cleaning process, the recording head 102 is located at a recording position (FIG. 4A). When the cleaning process is started, the recording head 102 moves upward (FIG. 4B), and the cleaning liquid application mechanism 104 relatively moves under the recording head 102. At this time, the recording head 102 may move above the cleaning liquid application mechanism 104 or the cleaning liquid application mechanism 104 may move under the recording head 102.

Figure 4C:
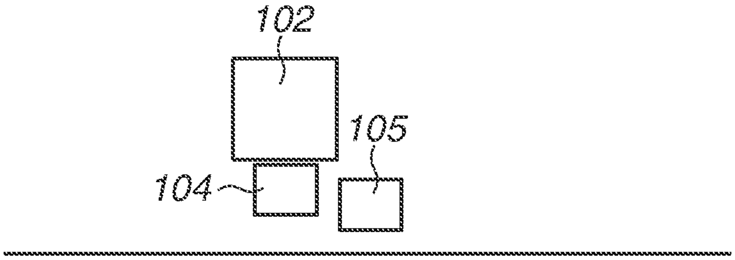

When the cleaning liquid application mechanism 104 has moved under the discharge port surface 107, the process proceeds to the cleaning liquid application step. In the cleaning liquid application step, a cleaning liquid application nozzle 417 described below of the cleaning liquid application mechanism 104 (see FIG. 5) contacts the discharge port surface 107 and moves while applying the cleaning liquid to the discharge port surface 107 (FIG. 4C). The cleaning liquid desirably has a water content of 50 parts or more by weight and a viscosity of 2 centiPoise (cP) or less, and is lower in surface free energy than the ink used for recording.

Figure 5:
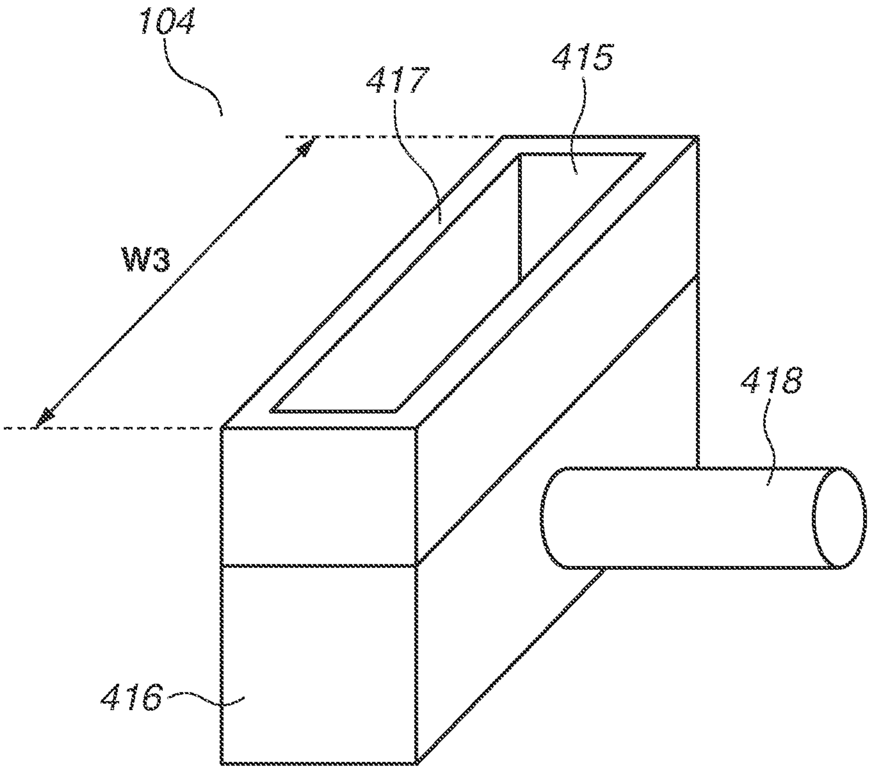
FIG. 5 is a schematic diagram illustrating a configuration of a cleaning liquid application mechanism according to the first exemplary embodiment.

A configuration of the cleaning liquid application mechanism 104 in the present exemplary embodiment will be described with reference to FIG. 5. The cleaning liquid application mechanism 104 includes the cleaning liquid application nozzle 417 with an opening 415, and a cleaning liquid application mechanism holder 416, and is connected to a cleaning liquid tank not illustrated via a tube 418. The cleaning liquid application mechanism 104 can continuously supply the cleaning liquid to the cleaning liquid application nozzle 417 via the tube 418, and can continuously apply the cleaning liquid to the discharge port surface 107 while the cleaning liquid application nozzle 417 and the discharge port surface 107 of the recording head 102 are in contact with each other. The cleaning liquid application nozzle 417 is made of rubber and has a high degree of capability to follow the discharge port surface 107 of the recording head 102 at the time of contact with the discharge port surface 107. Accordingly, when the cleaning liquid application nozzle 417 is pressed against the discharge port surface 107, the cleaning liquid application nozzle 417 can contact the discharge port surface 107 under uniform pressure.

A length W3 of the cleaning liquid application mechanism 104 along the longitudinal direction is made greater than a distance W2 between the hydrophilic surface 312 provided at the highest position and the hydrophilic surface 312 provided at the lowest position on the element chip 309 illustrated in FIG. 3B. In the cleaning step, at a certain timing in the state where the cleaning liquid application mechanism 104 is in contact with the discharge port surface 107, the cleaning liquid application nozzle 417 of the cleaning liquid application mechanism 104 contacts the element chip 309 in an area 314. As the cleaning liquid application step progresses from the state in FIG. 3B, the point at which the cleaning liquid application nozzle 417 contacts moves along with the movement of the area 314 in the direction D. Accordingly, the cleaning liquid application mechanism 104 can apply the cleaning liquid to the hydrophilic surfaces 312 and the discharge port lines 313 provided on the element chip 309 at once. The applied cleaning liquid forms an integral liquid film on the discharge port surface 107. The cleaning liquid is applied to each of the element chips 309 provided on the discharge port surface 107. When the application of the liquid to all the element chips 309 completes, that is, when the cleaning liquid application mechanism 104 has moved in contact with the discharge port surface 107 from the left end to right end of the base substrate 308 provided on the discharge port surface 107, the liquid application is ended.

Figure 4D:
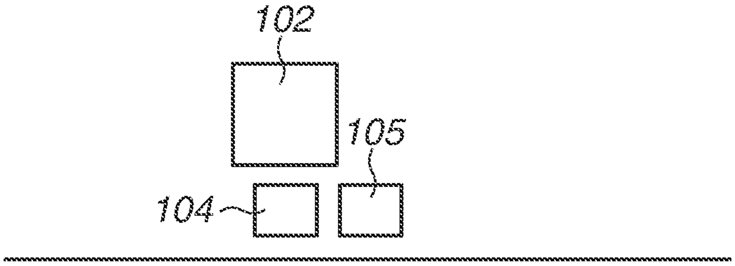
Figure 4E:
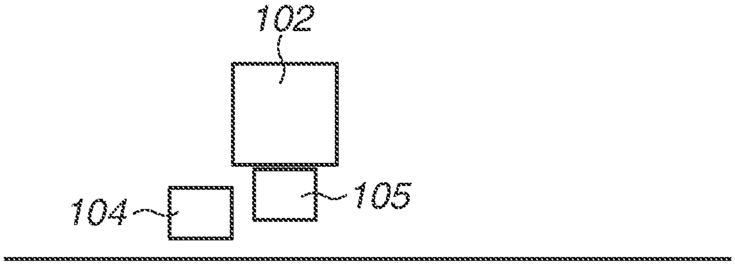

Upon completion of application of the cleaning liquid to the discharge port surface 107, the cleaning liquid application mechanism 104 is separated from the discharge port surface 107 (FIG. 4D). Specifically, the cleaning liquid application mechanism 104 is separated by ceasing the contact between the discharge port surface 107 and the cleaning liquid application nozzle 417 to make longer the relative distance between the discharge port surface 107 and the cleaning liquid application nozzle 417. Accordingly, the liquid application step is ended and the process proceeds to the cleaning liquid removal step. In the cleaning liquid removal step, as illustrated in FIG. 4E, the sliding mechanism 105 relatively moves under the recording head 102 and slides on the discharge port surface 107 in contact with the discharge port surface 107 to remove the cleaning liquid from the discharge port surface 107.

Figure 6:
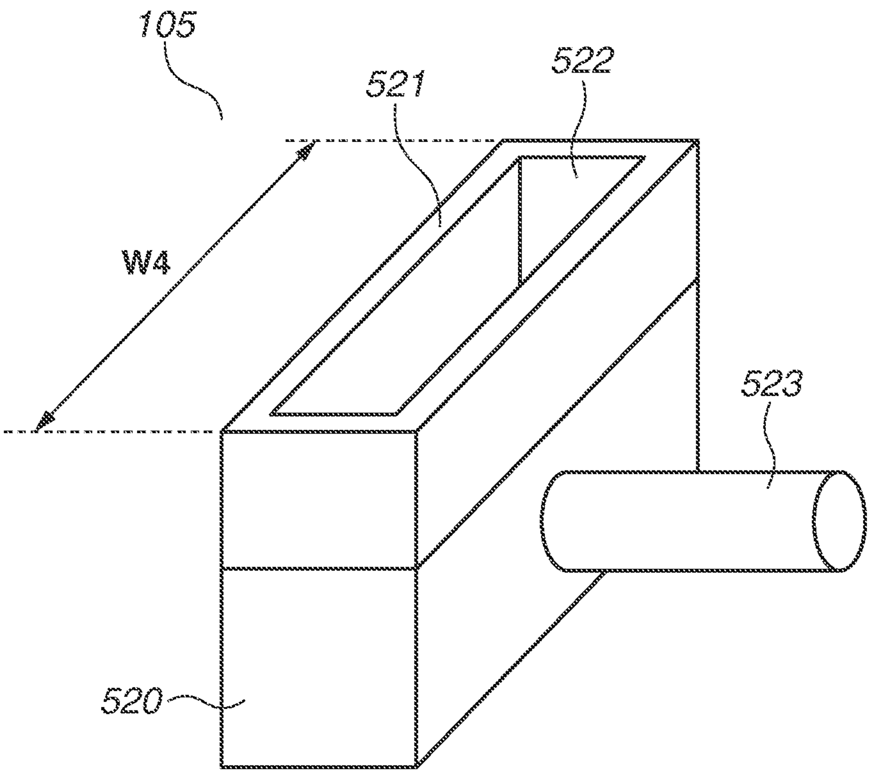
FIG. 6 is a perspective view of a sliding mechanism according to the first exemplary embodiment.

FIG. 6 is a perspective view of the sliding mechanism. The sliding mechanism includes a suction holder 520 and a suction nozzle 521 with an opening 522, and is connected via a tube 523 to a negative pressure generation mechanism such as a suction pump not illustrated. While the negative pressure generation mechanism is operating, the inside of the suction nozzle 521, that is, the opening 522 is reduced in pressure to suck in air. When the suction nozzle 521 is in contact with the discharge port surface 107 of the recording head 102 while the negative pressure generation mechanism is operating, the cleaning liquid and the residual ink are sucked in through the opening 522. Similarly to the cleaning liquid application mechanism 104 described above, the suction nozzle 521 is made of rubber and has a high degree of capability of following the discharge port surface 107, and can contact the discharge port surface 107 under uniform pressure. A length W4 of the suction nozzle 521 along the longitudinal direction is set to generally coincide with the length W3 of the cleaning liquid application nozzle 417 in the cleaning liquid application mechanism 104. Accordingly, the area where the sliding mechanism 105 slides on the discharge port surface 107 is substantially equal to the area where the cleaning liquid application mechanism 104 applies the cleaning liquid to the discharge port surface 107 in the cleaning liquid application step described above. The length W4 of the sliding mechanism 105 may be made greater than the length W3 of the cleaning liquid application mechanism 104. In that case, the cleaning liquid and residual ink can be more removed.

Figure 7A:
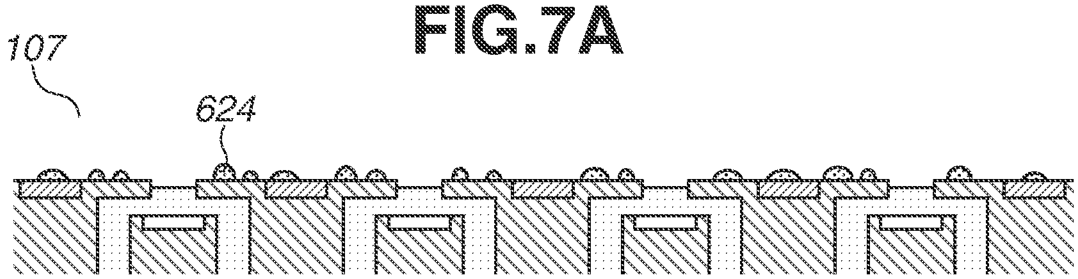
FIGS. 7A to 7C are cross-sectional views of the discharge port surface for describing in detail the cleaning process according to the first exemplary embodiment.
Figure 7B:
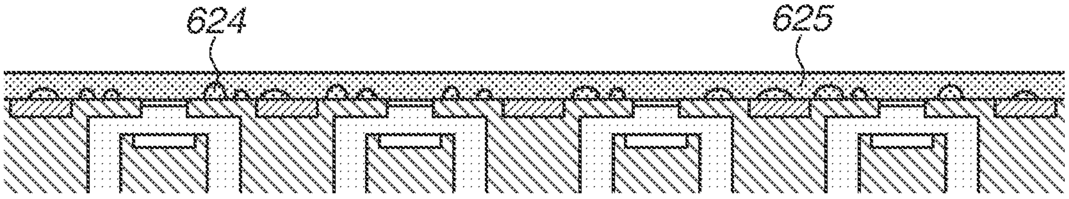
Figure 7C:
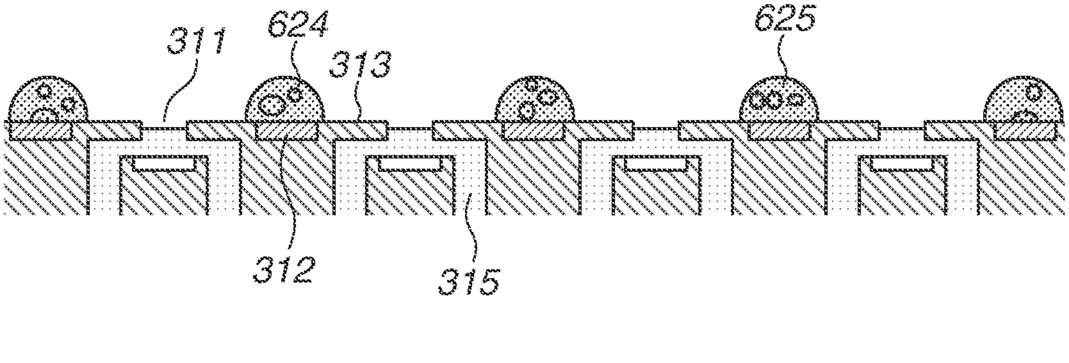

FIGS. 7A to 7C are cross-sectional views of the discharge port surface for describing the cleaning process in more detail. The states of the discharge port surface 107 and its vicinity illustrated in FIGS. 4A to 4E will be described. In the duration of time from the start of the cleaning process to the cleaning liquid application step, that is, in the states illustrated in FIGS. 4A and 4B, residual ink 624 is attached to the discharge port surface 107 as illustrated in FIG. 7A. The ink used in the present exemplary embodiment contains a color material, water as a solvent, and fine resin particles. When the water content decreases due to evaporation or the like, the resin particles bind to each other, become solid matter, and are reduced in solubility in water and other liquids. The solution in water here also includes solid matter finely redispersed in latex form in the liquid. The residual ink 624 includes part of the ink that has been discharged from the discharge ports 311 onto the recording medium 103 and dispersed in mist form, and part of the ink that has not been normally discharged from the discharge ports 311 due to adhesion of foreign matters such as paper dust generated in the recording apparatus 1000. The residual ink 624 includes very fine particles, and is large in the surface area relative to the volume and is prone to cause water evaporation. Accordingly, the residual ink may become solid even if the time elapsed from the sticking to the discharge port surface 107 is short.

After the cleaning liquid application step starts (FIG. 4C) and then the cleaning liquid application step ends (FIG. 4D), a cleaning liquid 625 is present in liquid-film form on the discharge port surface 107 as illustrated in FIG. 7B. The amount of the cleaning liquid 625 applied to the discharge port surface 107 is desirably set such that the cleaning liquid 625 can be retained on the discharge port surface 107 and cleaning performance can be sufficiently exerted. In the present exemplary embodiment, 40 $g/m^2$ of the cleaning liquid 625 is applied to the overall discharge port surface 107. Although the amount of the residual ink 624 dissolving in the cleaning liquid 625 is very small, the cleaning liquid 625 permeates into the contact interface between the residual ink 624 and the discharge port surface 107 so that the residual ink 624 is liberated from the discharge port surface 107.

When a specific period of time has elapsed from the application of the cleaning liquid 625, the cleaning liquid 625 is repelled from the water-repellent part 613, and moves onto the hydrophilic surfaces 312 and forms liquid droplets, as illustrated in FIG. 7C. Since the residual ink 624 is liberated from the discharge port surface 107 due to the application of the cleaning liquid 625 as described above, the residual ink 624 moves together with the cleaning liquid 625 onto the hydrophilic surfaces 312.

In the present exemplary embodiment, the cleaning liquid removal step is started in the state as illustrated in FIG. 7C. In the cleaning liquid removal step, the cleaning liquid 625 and the solid residual ink 624 contained in the cleaning liquid 625 are sucked and removed from the discharge port surface 107 by the suction nozzle 521. At this time, because the residual ink 624 is collected together with the droplets of the cleaning liquid 625 on the hydrophilic surfaces 312, the suction nozzle 521 slides in the state where the residual ink 624 is separated from the discharge ports 311. The suction of the residual ink 624 by the suction nozzle 521 reduces the intrusion of the residual ink 624 into the discharge ports 311 that could interfere with discharge of the ink from the discharge ports 311.

With the configuration described above, the cleaning liquid 625 can be removed in the state where the residual ink 624 is kept away from the discharge ports 311 in the cleaning process of the discharge port surface 107 of the recording head 102, thereby reducing the possibility of the residual ink 624 intruding into the discharge ports 311.

Figure 8A:
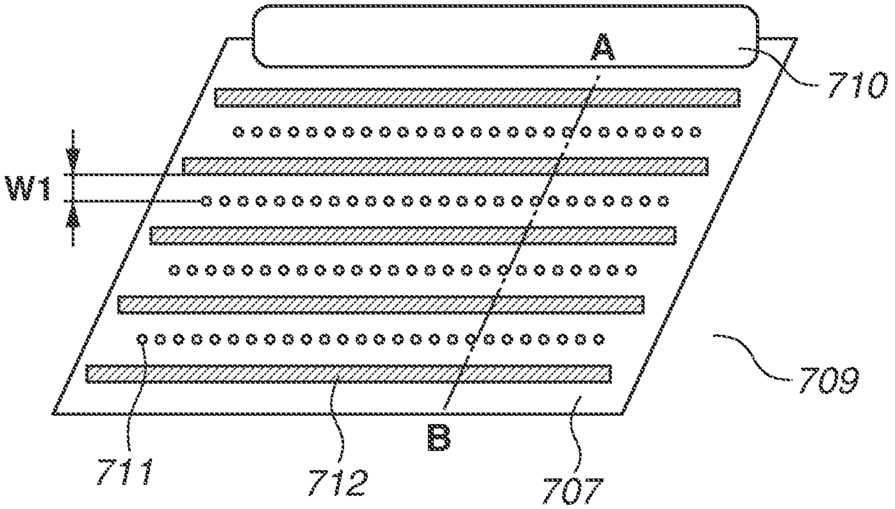
FIGS. 8A and 8B are schematic diagrams illustrating a configuration and a cross section of an element chip of a recording head according to a second exemplary embodiment.
Figure 8B:
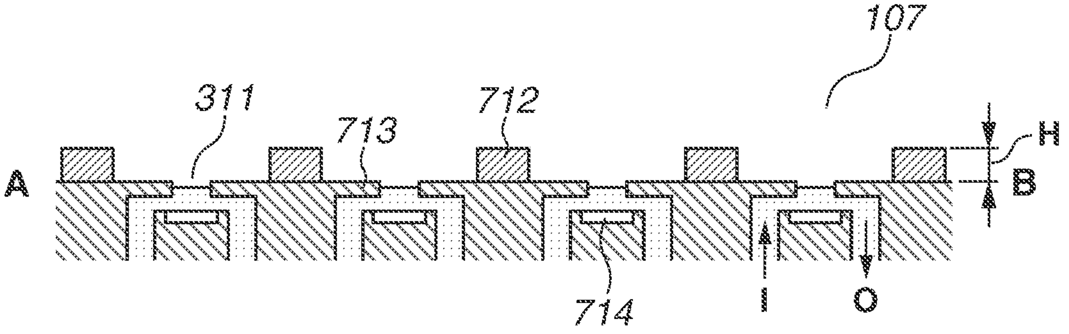

A second exemplary embodiment will be described. Description of components similar to those according to the first exemplary embodiment will be omitted. FIGS. 8A and 8B are schematic diagrams illustrating a configuration and cross section of an element chip of a recording head according to the second exemplary embodiment. FIG. 8A illustrates the configuration of the element chip, and FIG. 8B illustrates the cross section taken along line A-B in FIG. 8A.

In the present exemplary embodiment, as in the first exemplary embodiment, hydrophilic surfaces 712 are formed on a surface 707 of an element chip 709 having undergone water-repellent treatment. The hydrophilic surfaces 712 of the element chip 709 have a convex shape that protrudes at height H from water-repellent surfaces 713 in a discharge direction in which discharge ports 711 discharge the ink. In the present exemplary embodiment, the hydrophilic surfaces 712 are formed with height H=50 μm, but the height H may be changed as appropriate in accordance with the dimensions of the element chip 709. In the present exemplary embodiment, the height H of the hydrophilic surfaces 712 is desirably 20 μm or more. The hydrophilic surfaces 712 can be formed by using a means of pasting together existing materials such as metal, resin, and ceramics.

Figure 9A:
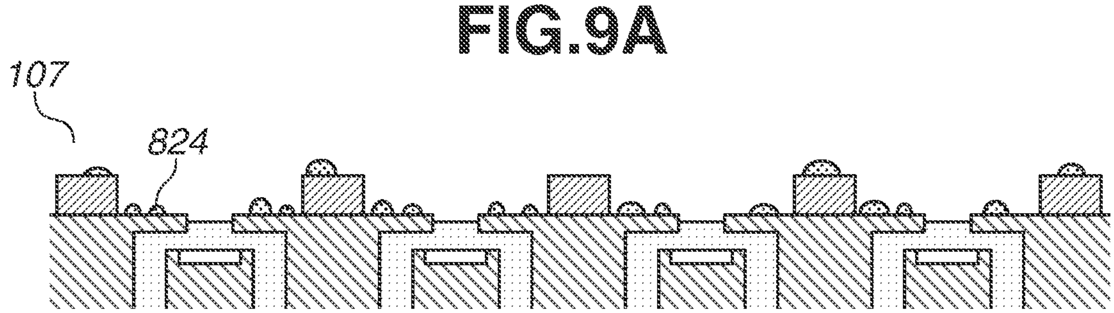
FIGS. 9A to 9C are cross-sectional views of a discharge port surface for describing in detail a cleaning process according to the second exemplary embodiment.
Figure 9B:
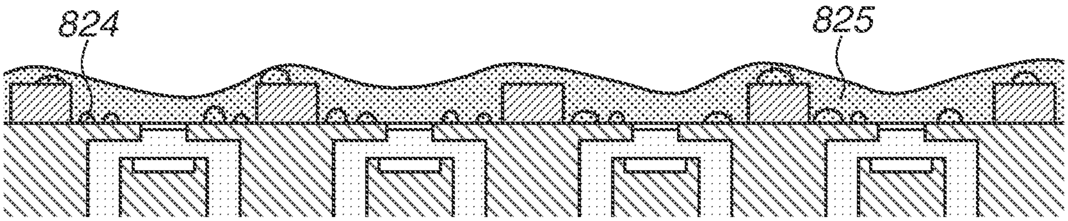

FIG. 9 is a cross-sectional view of a discharge port surface for describing a cleaning process. As in the first exemplary embodiment, the cleaning process according to the present exemplary embodiment includes a cleaning liquid application step and a cleaning liquid removal step. During the duration of time from the start of the cleaning process to the start of the cleaning liquid application step, residual ink 824 remains on a discharge port surface 107 as illustrated in FIG. 9A. At the end of the cleaning liquid application step, a cleaning liquid 825 is present in liquid-film form on the discharge port surface 107 as illustrated in FIG. 9B. In the present exemplary embodiment, 45 $g/m^2$ of the cleaning liquid 825 is applied to the overall discharge port surface 107. The residual ink 824 is liberated from the discharge port surface 107 due to the application of the cleaning liquid.

Figure 9C:
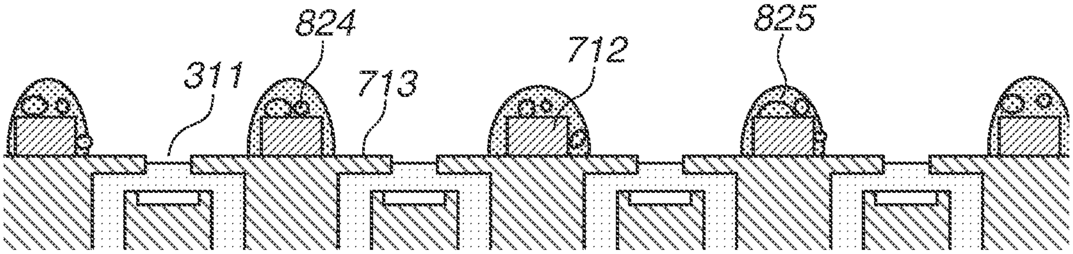

When a specific period of time has elapsed from the application of the cleaning liquid 825, the cleaning liquid 825 is repelled from the water-repellent surfaces 713, and moves onto the hydrophilic surfaces 712 and forms liquid droplets, as illustrated in FIG. 9C. Since the residual ink 824 is liberated from the discharge port surface 107 due to the application of the cleaning liquid 825 as described above, the residual ink 824 moves together with the cleaning liquid onto the hydrophilic surfaces 712. Thus, the hydrophilic surfaces 712 protrude at height H with respect to the water-repellent surfaces 713. Thus, the hydrophilic surfaces 712 are large in surface area as compared to the case where the hydrophilic surfaces 712 and the water-repellent surfaces 713 are identical in height, and a larger amount of the cleaning liquid 825 can be collected. Accordingly, the amount of the cleaning liquid 825 and residual ink 824 moving from the hydrophilic surfaces 712 onto the water-repellent surfaces 713 increase, and the residual ink 824 can be removed more efficiently in the subsequent cleaning liquid removal step.

Since the inkjet recording head according to the present exemplary embodiment has the hydrophilic surfaces 712 higher than the water-repellent surfaces 713, when a rubber suction nozzle 521 slides, the water-repellent surfaces 713 are placed under weaker pressure than the hydrophilic surfaces 712 are. This reduces the load on the discharge ports 711 and the water-repellent surfaces 713 and maintains the discharge performance and the water-repellent performance.

In general, a hydrophilic surface has a stronger force of adhesion to residual ink than a water-repellent surface does. However, because the hydrophilic surfaces 712 constitute convex parts as described above, the hydrophilic surfaces 712 contact the suction nozzle 521 under a higher pressure than that on the water-repellent surfaces 713. Accordingly, it is possible to efficiently remove the residual ink 824 from the hydrophilic surfaces 712 by a stronger force of contact with the suction nozzle 521 and reduce the load on the water-repellent surfaces 713 by a weaker force of contact with the suction nozzle 521.

In both the first exemplary embodiment and the second exemplary embodiment, a step for facilitating the movement of the cleaning liquid to the hydrophilic surfaces in the cleaning step may be added. For example, a step of providing a waiting time after the cleaning liquid application step, a step of applying vibration to the discharge port surface 107, a step of heating the cleaning liquid to improve the fluidity, or the like may be provided, or another step of facilitating the movement of the cleaning liquid may be provided.

The sliding member may have no nozzle, and may remove the cleaning liquid from the discharge port surface simply by wiping with a blade wiper or the like formed of an elastic member.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-073846, filed Apr. 27, 2023, which is hereby incorporated by reference herein in its entirety.

What is claimed is:

1. A cleaning method of cleaning a recording apparatus including a recording head with a discharge port surface, wherein the cleaning method is a method for cleaning the discharge port surface and the discharge port surface includes:

a discharge port line in which a plurality of discharge ports configured to discharge a liquid is aligned in a first direction, a hydrophilic part that is provided separated from the discharge port line and protrudes from the discharge port surface in a discharge direction of the liquid from the plurality of discharge ports, and a water-repellent part that is located between the hydrophilic part and the discharge port line, the cleaning method comprising:

applying a cleaning liquid to the discharge port surface by a cleaning liquid application unit; and removing the cleaning liquid by a cleaning liquid removal unit in a state where the cleaning liquid, applied to the discharge port surface in the applying of the cleaning liquid, has been moved onto the hydrophilic part, wherein the cleaning liquid removal unit comprises an elastic member configured to slide on the discharge port surface while being in contact with the discharge port surface, and wherein the hydrophilic part protrudes from the discharge port surface by a height such that, during a sliding of the cleaning liquid removal unit, a contact pressure applied by the elastic member to the hydrophilic part is greater than a contact pressure applied by the elastic member to the water-repellent part.

2. The cleaning method according to claim 1, wherein a plurality of discharge port lines is arranged on the discharge port surface in a second direction intersecting the first direction, and a plurality of hydrophilic parts is provided in correspondence with the plurality of discharge port lines, and wherein applying of the cleaning liquid includes applying of the cleaning liquid via the cleaning liquid application unit to the plurality of discharge port lines, the plurality of hydrophilic parts, and the water-repellent part.

3. The cleaning method according to claim 1, wherein the cleaning liquid removal unit has a nozzle formed of an elastic member, the cleaning method further comprising:

bringing the nozzle into contact with the discharge port surface while inside of the nozzle is reduced in pressure by a negative pressure generation mechanism; and sliding the nozzle on the discharge port surface to suck and remove the cleaning liquid.

4. The cleaning method according to claim 1, wherein the hydrophilic part is formed of a material with a water contact angle of less than 90°.

5. The cleaning method according to claim 1, wherein the water-repellent part is formed of a material with a water contact angle of 90° or more.

6. The cleaning method according to claim 1, wherein the liquid contains a color material and a resin particle.

7. The recording apparatus according to claim 1, further comprising, after applying the cleaning liquid and before removing the cleaning liquid, waiting for a predetermined time period to cause the cleaning liquid to move from the water-repellent part onto the hydrophilic part.

8. A recording apparatus comprising:

a recording head having a discharge port surface, wherein the discharge port surface includes:

a discharge port line in which a plurality of discharge ports configured to discharge a liquid is aligned in a first direction, a hydrophilic part that is provided separated from the discharge port line and protrudes from the discharge port surface in a discharge direction of the liquid from the plurality of discharge ports, a water-repellent part that is located between the hydrophilic part and the discharge port line;

a cleaning liquid application unit configured to apply a cleaning liquid to the discharge port surface; and a cleaning liquid removal unit configured to remove the cleaning liquid in a state where the cleaning liquid, applied to the discharge port surface by the cleaning liquid application unit, has been moved onto the hydrophilic part, wherein the cleaning liquid removal unit comprises an elastic member configured to slide on the discharge port surface while being in contact with the discharge port surface, and wherein the hydrophilic part protrudes from the discharge port surface by a height such that, during a sliding of the cleaning liquid removal unit, a contact pressure applied by the elastic member to the hydrophilic part is greater than a contact pressure applied by the elastic member to the water-repellent part.

9. The recording apparatus according to claim 8, further comprising:

a plurality of discharge port lines arranged on the discharge port surface in a second direction intersecting the first direction; and a plurality of hydrophilic parts provided in correspondence with the plurality of discharge port lines, wherein the cleaning liquid application unit further is configured to apply the cleaning liquid to the plurality of discharge port lines, the plurality of hydrophilic parts, and the water-repellent part.

10. The recording apparatus according to claim 8, wherein the cleaning liquid removal unit has a nozzle formed of an elastic member, the nozzle is configured to be brought into contact with the discharge port surface while inside of the nozzle is reduced in pressure by a negative pressure generation mechanism, and the nozzle further is configured to be slid on the discharge port surface to suck and remove the cleaning liquid.

11. The recording apparatus according to claim 8, wherein the hydrophilic part is formed of a material with a water contact angle of less than 90°.

12. The recording apparatus according to claim 8, wherein the water-repellent part is formed of a material with a water contact angle of 90° or more.

13. The recording apparatus according to claim 8, wherein the liquid contains a color material and a resin particle.

* * * * *